Inventors
Cyril Geacintov
Raymond E. Eichenbaum
William C. L. Wu
By Hastings S. Trigg
Attorney

United States Patent Office 3,464,962
Patented Sept. 2, 1969

3,464,962
COPOLYMERS OF BUTENE-1 AND PROPYLENE
Cyril Geacintov, Scotch Plains, Raymond Eichenbaum, Spotswood, and William C. L. Wu, East Brunswick, N.J., assignors to Mobil Oil Corporation, a corporation of New York
Continuation-in-part of application Ser. No. 461,717, June 7, 1965. This application Nov. 18, 1965, Ser. No. 508,419
Int. Cl. C08f *15/04, 1/32*
U.S. Cl. 260—88.2          7 Claims

ABSTRACT OF THE DISCLOSURE

A copolymer of butene-1 and propylene (10-18 mole percent of the polymer) rapidly forms the stable Form I upon cooling from the melt. It is produced by copolymerizing a mixture of 91-95 mole percent butene-1 and 9-5 mole percent propylene, using a catalyst system containing titanium trichloride, diethylaluminum chloride, and diethylaluminum iodide in specified molar proportions.

---

This is a continuation-in-part of copending application Ser. No. 461,717, filed June 7, 1965.

This invention relates to olefin polymerization. It is more particularly concerned with novel copolymers of butene-1 and propylene and with a method for producing them.

As is well known to those familiar with the art, butene-1 and propylene can be homopolymerized into crystalline polymers. Such homopolymers have been produced with an isotactic index (measured as the weight percent insoluble in boiling diethyl ether) in the order of 95-98. Generally, however, when these olefins have been copolymerized, the resultant copolymer has been less crystalline. This is evidenced by a decreased isotactic index.

Polybutene-1 has two major crystalline forms. Upon cooling from the melt, there is formed a metastable crystalline modification known as "Form II." Over a period of time, usually several days, the Form II modification transforms into a stable modification known as "Form I." The transformation from Form II to Form I is accompanied by dimensional change in the polymer. The dimensional instability of polybutene-1 renders it disadvantageous for many applications. For example, films which are initially clear lose their optical clarity as the polymer changes crystalline form.

There has now been found a crystalline copolymer of butene-1 and propylene that has the desirable properties of a butene-1 homopolymer, but which avoids the undesirable phase transformation and dimensional instability characteristics thereof. It has been discovered that such copolymer can be produced by a process that involves a critical selection of reaction conditions, reactant proportions, and catalyst components.

Figure 1:
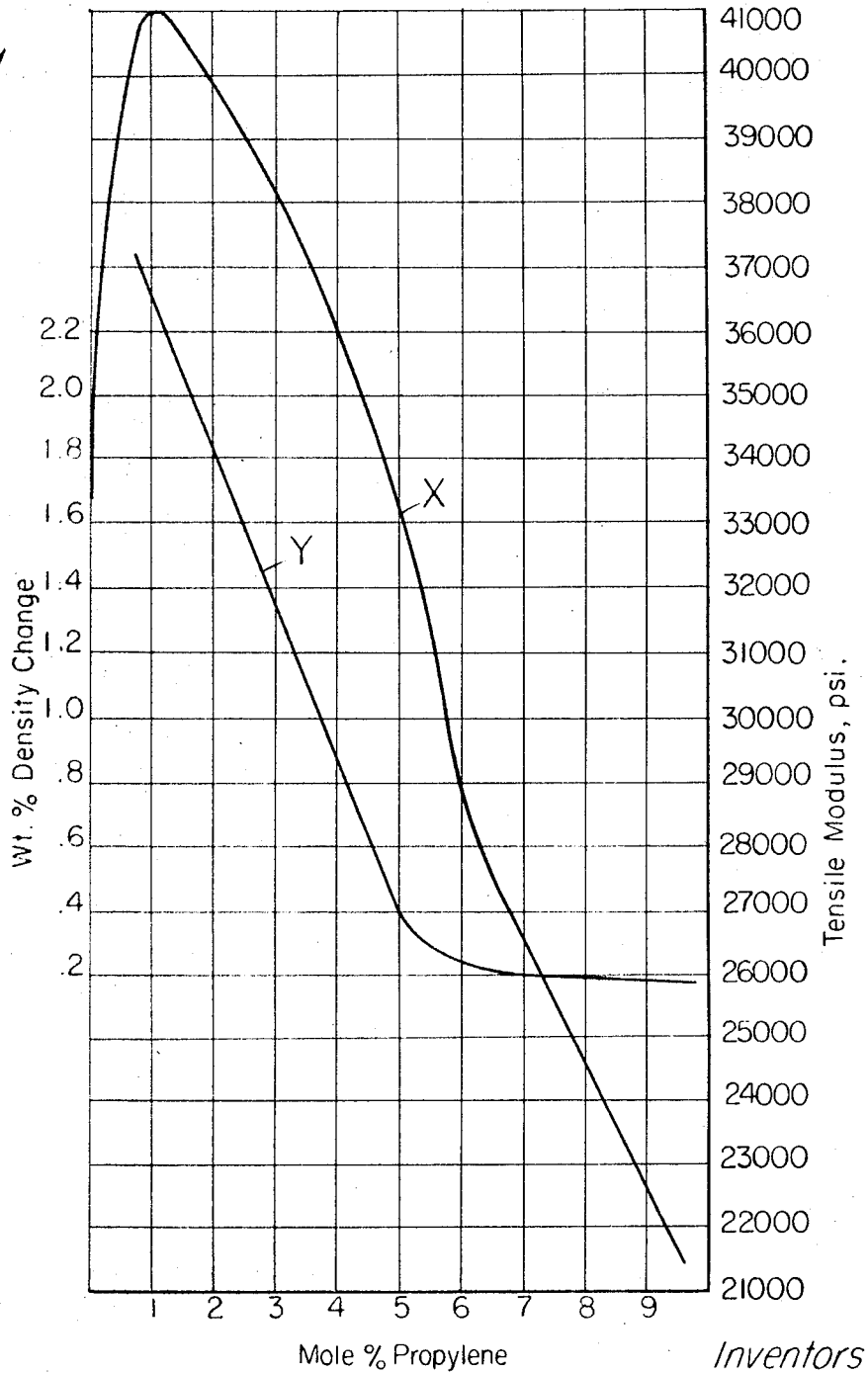
Figure 2:
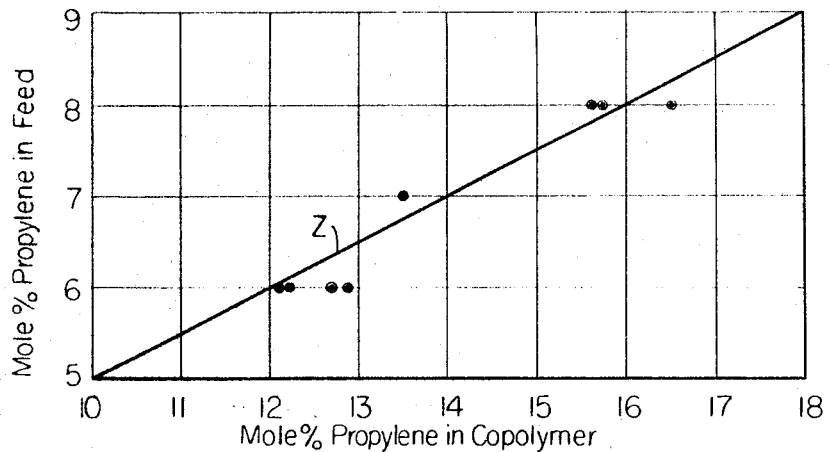
Figure 3:
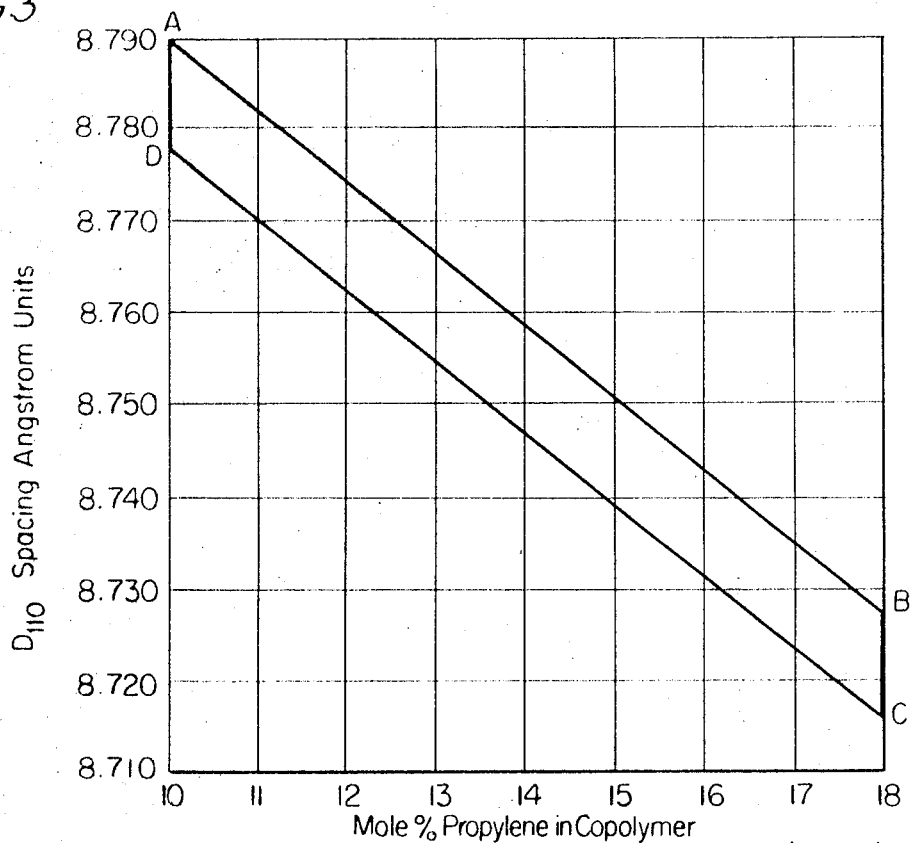

Accordingly, it is a broad object of this invention to provide novel copolymers of butene-1 and propylene. Another object is to provide a process for producing such novel copolymers. A specific object is to provide novel copolymers of butene-1 and propylene that retain the desirable properties of a butene-1 homopolymer, but which avoid the undesirable phase transformation and dimensional instability characteristics of the homopolymer. Another specific object is to provide a process for producing such copolymers that involves a critical selection of reaction conditions, reactant proportions, and catalyst components. Other objects and advantages of this invention will become apparent to those skilled in the art, from the following detailed description, considered in conjunction with the drawings wherein:

FIGURE 1 presents curves showing the relationship between the mole percent propylene, in a propylene-butene-1 feed, and the tensile modulus and the percent postcrystallization of copolymers produced under the process conditions of the process of this invention;

FIG. 2 shows the relationship between the mole percent propylene, in a propylene-butene-1 feed, and the mole percent propylene in a copolymer of copolymers produced under the process conditions of the process of this invention; and FIG. 3 shows the relationship between the mole percent propylene in the copolymers of this invention and their $d_{110}$ spacing.

This invention provides a copolymer of butene-1 and propylene that rapidly transforms from the metastable Form II to the stable Form I upon cooling from the melt, has a postcrystallization of less than 0.5 weight percent, and a tensile modulus greater than about 25,000 p.s.i. The copolymer is further characterized by a propylene content in the copolymer of between about 10 mole percent and about 18 mole percent, preferably between about 12 mole percent and about 16 mole percent, and a $d_{110}$ spacing correlated with the mole percent propylene in the copolymer to define a point falling within the area delineated by points A, B, C, and D in FIG. 3 of the accompanying drawings.

This invention also provides a method for producing these copolymers that comprises copolymerizing a monomer mixture containing 91-95 mole percent butene-1 and 9-5 mole percent propylene at a temperature between about 130° F. and about 150° F., in the presence of a catalyst system consisting essentially of titanium trichloride, diethylaluminum iodide, and diethylaluminum chloride wherein the mole percent ratio of diethylaluminum chloride to diethylaluminum iodide is between about 4:1 and about 0.5:1 and the molar ratio of aluminum to titanium is between 3:1 and 6:1.

The butene-1-propylene copolymers of this invention have the desirable outstanding physical characteristics of polybutene-1 homopolymer, including toughness, good stress-crack properties, and high oxygen permeability. They have X-ray and infrared patterns typical of polybutene-1 homopolymer in the Form I crystalline modification. Close examination of the X-ray diffraction pattern of the copolymers, however, reveals that the interplanar $d$-spacing of the 110 refection ($d_{110}$) of the Form I phase had undergone an 8-10% decrease. This reflects a contraction of the unit cell, as a result of the incorporation of the smaller propylene molecules into a polybutene-1 crystal lattice. Indeed, the copolymer exhibits a characteristic $d_{110}$ spacing that is correlative with its propylene content. Such correlation is more completely described and defined hereinafter.

Upon cooling the copolymers of this invention from the melt (i.e., moltent state), they transform extremely rapidly from Form II into stable Form I. In fact, Form II is usually virtually undetectable. Consequently, they are dimensionally stable and undergo no further crystalline change and, therefore, only a minimum postcrystallization is observed. Indeed, the amount of postcrystallization is less than 0.5 percent by weight, as measured, over a 24-hour period, in a density gradient column, wherein the weight percent change of density of the polymer is measured as a function of time.

The copolymers of this invention have a tensile modulus, determined by ASTM method D638 using a D412 sample, greater than 25,000 p.s.i., usually between about 25,000 and about 35,000 p.s.i.

The copolymers have outstanding electrical insulating properties, toughness, and flexibility. Accordingly, they are suitable for use in wire and cable insulation, plastic pipes, films, coatings, heavy duty bags, food wraps, and other applications, either by themselves or blended with other polymers.

In order to produce the copolymers of this invention having the aforedescribed properties and characteristics, several critical factors must be carefully controlled. These factors are proportions of the monomers, the catalyst composition, and the reaction conditions. The copolymerization can be carried out in batch operation or in a continuous operation.

The monomers used to produce the copolymers are butene-1 and propylene. The monomer feed molar ratio must be maintained at 91–95 mole percent butene-1 and 9–5 mole percent propylene. The preferred ratio is 92–94 mole percent butene-1 and 8–6 mole percent propylene. This is demonstrated in the following examples.

Examples 1 through 9

A series of batch bulk polymerization runs were carried out, varying the mole percent propylene in the butene-1 feed for each run. In each run, the catalyst components were titanium trichloride ($3TiCl_3 \cdot AlCl_3$) and a mixture of 80 mole percent diethylaluminum chloride and 20 mole percent diethylaluminum iodide (4:1 ratio), wherein the molar ratio of aluminum to titanium was 3:1. Each run was carried out at 150° F. for one hour.

For each polymer product, the weight percent density change over a 24-hour period and the tensile modulus were determined. The pertinent data for each run are set forth in Table I.

TABLE I

| Example | Feed, mole percent | | Wt. percent density change | Tensile modulus, p.s.i. |
|---|---|---|---|---|
| | Butene-1 | Propylene | | |
| 1 | 100 | 0 | | 33,300 |
| 2 | 99 | 1 | | 41,000 |
| 3 | 98 | 2 | 1.85 | 39,600 |
| 4 | 97 | 3 | 1.39 | 38,000 |
| 5 | 96 | 4 | 0.96 | 36,600 |
| 6 | 95 | 5 | 0.40 | 33,300 |
| 7 | 94 | 6 | 0.23 | 29,100 |
| 8 | 92 | 8 | 0.21 | 25,500 |
| 9 | 90.4 | 9.6 | | 21,400 |

The curves in FIGURE 1 are based upon the data set forth in Table I. Curve X shows the graphical relationship between the mole percent propylene in a butene-1-propylene feed, that is subjected to polymerization under the conditions of this invention, and the tensile modulus of the polymer produced from each feed. Curve Y shows the concomitant relationship the mole percent propylene in each such feed and the weight percent density change (i.e., weight percent postcrystallization), over a 24-hour period, of the polymer produced. From FIGURE 1, it will be noted that, as increasing amounts of propylene are used in the feed, the tensile modulus of the polymer increases, from 100% butene-1 to a maximum and then decreases. At between about 8% and 9% propylene the tensile modulus has decreased to about 25,000 p.s.i. Above about 9% propylene, the tensile modulus is well below the acceptable minimum of 25,000 p.s.i. for heavy duty purposes. Together with a high tensile modulus of at least about 25,000 p.s.i. however, a copolymer of this invention must have dimensional stability, as evidenced by a postcrystallization of below about 0.5 weight percent. As is noted from FIGURE 1 (curve Y), dimensional stability is not achieved until about 5 mole percent propylene is used in the copolymer feed. Accordingly, the copolymers of this invention, having high tensile modulus and dimensional stability, are produced only from feed mixtures containing between about 5 mole percent and about 9 mole percent propylene and between about 95 mole percent and about 91 mole percent butene-1. In preferred practice the feed mixture will contain between about 6 and about 8 mole percent propylene and between about 94 and about 92 mole percent butene-1.

Although the aforedescribed ranges of propylene content in the feed have been determined upon the basis of one set of reaction conditions, they are applicable to polymerization reactions carried out at other conditions within the ranges set forth hereinafter. When operating within these ranges of conditions, however, certain general relationships among the conditions should be observed, in order to achieve the production of the novel copolymers of this invention characterized by high tensile modulus and dimensional stability. These relationships are described and illustrated hereinafter.

The catalyst system used in the process for producing the copolymers of this invention consists essentially of titanium trichloride, diethylaluminum iodide, and diethylaluminum chloride. The molar ratio of diethylaluminum iodide to diethylaluminum chloride will be between about 4 and about 0.5, preferably between about 1.5 and about 0.5. The molar ratio of aluminum to titanium in the catalyst system will be between 3:1 and 6:1.

It is essential that the cocatalyst used herein is a mixture of diethylaluminum chloride and diethylaluminum iodide. The use of diethylaluminum iodide alone with $TiCl_3$ results in a catalyst system of low activity. When only diethylaluminum chloride is used in the catalyst system, the polymers produced have a low tensile modulus. This is demonstrated in the following example.

Example 10

Batch bulk polymerization runs were made using feeds containing 6–7 mole percent propylene, the balance being butene-1. Each run was carried out at 150° F. for one hour, in the presence of titanium trichloride and diethylaluminum chloride. The molar ratio of aluminum to titanium was about 3:1. In each case, the copolymer product produced had a tensile modulus of between about 8,000 p.s.i. and about 10,000 p.s.i.

The copolymerization process of this invention is carried out at temperatures of between about 130° F. and about 150° F. The contact time, or the average residence time in continuous operation, is between about 1 hour and about 5 hours.

As has been mentioned hereinbefore, some general considerations should be observed when operating within the aforedescribed ranges of conditions. When operating at temperatures of about 150° F., an aluminum to titanium molar ratio of about 3:1 is favored on short runs. Usually higher molar ratios of diethylaluminum chloride to diethylaluminum iodide, approaching 4:1, arer preferred under these conditions. Using the low aluminum to titanium molar ratio of 3:1 and a high molar ratio of diethylaluminum chloride to diethylaluminum iodide, temperatures as low as 130° F. can be used effectively. These relationships are illustrated in the following examples.

Examples 11 through 14

A series of batch bulk polymerization runs were made using a charge feed containing 8 mole percent propylene and 92 mole percent butene-1. All runs were carried out at 150° F. for one hour, except for Example 14 which was carried out at 140° F. for two hours. In each run, the catalyst system was titanium trichloride and diethylaluminum chloride and diethylaluminum iodide, in which the aluminum to titanium molar ratio and the molar ratio of diethylaluminum iodide were varied. Pertinent data and results of these runs are set forth in Table II, in comparison with the run of Example 8.

TABLE II

| Ex. | DEAC/DEAI [1] | Al/Ti [2] | Temp., °F. | Time, hrs. | Wt. percent density change | Tensile modulus, p.s.i. |
|---|---|---|---|---|---|---|
| 8 | 4 | 3 | 150 | 1 | 0.21 | 25,500 |
| 11 | 1.5 | 6 | 150 | 1 | 0.27 | 20,600 |
| 12 | 2.45 | 4 | 150 | 1 | 0.27 | 17,500 |
| 13 | 2 | 4 | 150 | 1 | 0.29 | 19,400 |
| 14 | 4 | 3 | 140 | 2 | 0.25 | 30,000 |

[1] Molar ratio diethylaluminum chloride to diethylaluminum iodide.
[2] Molar ratio aluminum to titanium.

When, however, operating for short run times at about 140° F., a preferred operating temperature, lower molar ratios of diethylaluminum chloride to diethylaluminum iodide can be used. Likewise, any molar ratio of aluminum to titanium appears to be effective. These relationships are illustrated in the following examples.

Examples 15 through 20

A series of batch bulk polymerization runs were carried out at about 140° F. for one hour. In each run, the charge feed was a mixture of 8 mole percent propylene and 92 percent butene-1. In each run, the catalyst system was titanium trichloride and diethylaluminum chloride and diethylaluminum iodide, in which the aluminum to titanium molar ratio and the molar ratio of diethylaluminum chloride to diethyl aluminum iodide were varied. Pertinent data and results of these runs are set forth in Table III.

TABLE III

| Example | DEAC/DEAI [1] | Al/Ti [2] | Wt. percent density change | Tensile modulus, p.s.i. |
|---|---|---|---|---|
| 15 | 2.45 | 3 | 0.20 | 25,500 |
| 16 | 2.45 | 4 | 0.30 | 26,900 |
| 17 | 2.45 | 5 | 0.10 | 30,200 |
| 18 | 2.45 | 6 | 0.22 | 26,000 |
| 19 | 2 | 4 | 0.22 | 27,500 |
| 20 | 2 | 6 | 0.21 | 29,700 |

[1] Molar ratio diethylaluminum chloride to diethylaluminum iodide.
[2] Molar ratio aluminum to titanium.

When operating on longer batch runs or at correspondingly longer residence times in continuous operation, aluminum to titanium molar ratios of between 4:1 and 6:1 are most feasible. Although polymerization temperatures of about 150° F. can be used, higher tensile moduli are usually achieved when operating at about 140° F. These considerations particularly applicable to continuous operation, are illustrated in the following examples.

Examples 21 through 29

A series of batch bulk polymerization runs were carried out at temperatures of about 140° F. or about 150° F. for four hours, except for Example 21 which was run for three hours. In each run, the charge feed was between 7–8.5 mole percent propylene, the balance being butene-1. In each run, the catalyst system was titanium trichloride and diethylaluminum chloride and diethylaluminum iodide, in which the aluminum to titanium molar ratio and the molar ratio of diethylaluminum chloride to diethylaluminum iodide were varied. Pertinent data and results of these runs are set forth in Table IV.

TABLE IV

| Ex. | Mole percent propylene | DEAC/DEAI [1] | Al/Ti [2] | Temp., °F. | Wt. percent density change | Tensile modulus, p.s.i. |
|---|---|---|---|---|---|---|
| 21 | 8 | 4 | 3 | 150 | 0.62 | 21,300 |
| 22 | 7 | 4 | 6 | 150 | 0.47 | 29,700 |
| 23 | 7 | 1.5 | 6 | 150 | 0.31 | 29,900 |
| 24 | 7 | 1.5 | 6 | 140 | 0.18 | 32,000 |
| 25 | 8 | 1.5 | 6 | 140 | 0.24 | 32,600 |
| 26 | 8.5 | 0.67 | 6 | 140 | 0.27 | 26,600 |
| 27 | 8.5 | 1.5 | 4 | 140 | 0.27 | 26,600 |
| 28 | 8 | 0.67 | 4 | 140 | 0.18 | 25,600 |
| 29 | 8 | 0.67 | 4 | 150 | 0.22 | 29,600 |

[1] Molar ratio diethylaluminum chloride to diethylaluminum iodide.
[2] Molar ratio aluminum to titanium.

Example 30

A polymerization run was carried out in a continuous bulk polymerization unit. Rigorously anhydrous conditions were maintained. The charge was a mixture of 91.5 mole percent butene-1 and 8.5 mole percent propylene. The catalyst components were titanium trichloride ($3TiCl_3 \cdot AlCl_3$) and a mixture of 40 mole percent diethylaluminum iodide and 60 mole percent diethylaluminum chloride. The catalyst components were added at a rate to maintain a molar ratio of aluminum to titanium of 6:1. The copolymerization was carried out at a temperature of 140° F. The rate of addition of olefin monomers was adjusted to maintain an average residence time of 3.7 hours and copolymers product was continuously removed. Throughout the run the copolymer produced had the following characteristics:

| | |
|---|---|
| Isotactic index (percent insoluble in boiling diethyl ether) | 95–98 |
| Tensile modulus (ASTM D638) p.s.i. | 28–32,000 |
| Postcrystallization, wt. percent | 0.2–0.4 |
| Density, g./cc. | 0.905–0.908 |
| Brittleness temp. | −23° C. |

It exhibited X-ray and infrared patterns characteristic of Form I polybutene-1.

Example 31

A continuous bulk polymerization run was carried out as descrbied in Example 30, except that the feed contained 8 mole percent propylene and 92 mole percent butene-1. The polymer produced had the following average properties:

| | |
|---|---|
| Isotactic index (percent insoluble in boiling diethyl ether) | 95 |
| Tensile modulus (ASTM D638) p.s.i. | 28,500 |
| Postcrystallization, wt. percent | 0.3 |
| Density, g./cc. | 0.9072 |

Example 32

A continuous bulk polymerization run was carried out as described in Example 30, except that the feed con- was 150° F., the aluminum to titanium molar ratio was 3:1, and the diethylaluminum chloride to diethylaluminum iodide molar ratio was 4. The tensile modulus of the polymer product was only about 16,900 p.s.i., although the weight percent postcrystallization was 0.45.

As in any stereospecific polymerization process of this type anhydrous conditions must be maintained and air and oxygen must be excluded. This is accomplished conventionally by operating the process under an atmosphere of inert gas, such as nitrogen. If it is desired to control the molecular weight of the copolymer, conventional materials for this purpose, such as hydrogen and carbon dioxide, can be added to the reaction system. Deactivation and removal of catalyst components from the reactor effluent and copolymer product recovery are effected by any of the various means well known to those skilled in the art.

The runs described in the foregoing specific working examples have been carried out using bulk polymerization techniques, i.e., without the use of solvents or slurrying media other than the 1-olefins charged, both in batch and in continuous operations. As is well known in the art, however, olefin polymerizations are frequently carried out in the presence of a solvent medium. The novel polymers produced in accordance with this invention can likewise be prepared in the presence of a solvent or slurrying agent. Typical solvents and slurrying agents, as is well known in the art, include hexane, heptane, octane, benzene, toluene, various paraffinic and aromatic hydrocarbon fractions, and halogenated hydrocarbons. The following example illustrates a run in accordance with this invention that is carried out in the presence of a solvent.

Example 33

A polymerization run was carried out in a 1-liter glass reactor. The reactor was charged with 600 ml. of n-heptane under rigorously anhydrous conditions. It was pressurized with butene-1 to a pressure of 873 mm. mercury at 66° C. (150° F.). Then, 125 ml. of additional n-heptane were added to the reactor followed by the addition of propylene until the equilibrium pressure was reached at 150° F. The feed contained 7.4 mole percent propylene and 92.6 mole percent butene-1. A catalyst system consisting of 0.247 g. titanium trichloride and 1.9 cc. of a mixture of diethylaluminum chloride and diethylaluminum iodide in a mole ratio of 4:1 was then flushed into the reactor with 75 ml. of n-heptane. The reaction mixture was then stirred vigorously for a period of two hours at 150° F., during which time the pressure in the reactor had dropped to 392 mm. mercury. Nitrogen was introduced into the reactor to increase the pressure to 403 mm. The reaction was continued for 40 additional minutes at 150° F., after which time it was quenched with methanol. The copolymer was recovered in the conventional manner. This copolymer product had a post-crystallization of about 0.3 weight percent. No differences in properties between the copolymer of this example and a copolymer produced by bulk polymerization from a comparable feed composition could be observed.

In the copolymers of this invention, there is a correlation between the amount of propylene in the feed and the amount of propylene in the final random copolymer. It has been found, by means of tracer isotopes, that the amount of propylene in the copolymer is about twice the amount of propylene in the feed. Also, as mentioned hereinbefore, there is a relationship between the $d_{110}$ spacing and the amount of propylene in the butene-1-propylene copolymer. These characteristics are demonstrated in the following examples.

Examples 34 through 41

A series of runs was carried out using the procedure, catalyst system, and conditions described in Examples 1 through 9. The only difference was that the propylene used in the copolymer feed was carbon-14 tagged propylene. For each copolymer formed, using various feed ratios of carbon-14 propylene and butene-1, the mole percent propylene in the copolymer was determined. The data are set forth in Table V.

Also, for each copolymer, the interplanar $d$-spacing of the 110 deflection, i.e., $d_{110}$, for Form I was determined by X-ray diffraction methods. These data are also set forth in Table V.

TABLE V

| Mole percent propylene in feed | Mole percent propylene in copolymer | $d_{110}$-Spacing, Angstroms |
| --- | --- | --- |
| 6 | 12.1 | 8.778 |
| 6 | 12.2 | 8.762 |
| 6 | 12.7 | 8.759 |
| 6 | 12.9 | 8.763 |
| 7 | 13.5 | 8.756 |
| 8 | 15.0 | 8.735 |
| 8 | 15.7 | 8.746 |
| 8 | 16.5 | 8.733 |

The plots in FIGS. 2 and 3 are based upon Table V. In FIG. 2, the curve Z is the line defining the relationship between the mole percent propylene in the feed and the mole percent propylene in the copolymer product, wherein the amount in the copolymer is twice that in the feed. It will be noted that the actual points plotted closely follow this 2:1 relationship. Accordingly, as the amount of propylene in the feed, as established hereinbefore, is between about 5 mole percent and about 9 mole percent, the amount of propylene in the butene-1-propylene copolymer will be between about 10 mole percent and about 18 mole percent. Using the preferred mole percent in the feed (between about 6 mole percent and about 8 mole percent), the copolymer will contain between about 12 mole percent and about 16 mole percent propylene.

FIG. 3 shows the relationship between the mole percent propylene in the copolymer and the $d_{110}$ spacing. The points defining the relationship between the mole percent propylene in the copolymer and the $d_{110}$ spacing (Table V) were found to define an area delineated by points A, B, C, and D. Accordingly, the amount of propylene in the copolymers of this invention is correlated with the $d_{110}$ spacing of the copolymer to define a point falling within the area delineated by points A, B, C, and D in FIG. 3.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. A method for producing copolymers that comprises copolymerizing
   (a) a monomer mixture containing about 91–95 mole percent butene-1 and about 9–5 mole percent propylene,
   (b) at a temperature between about 130° F. and about 150° F.,
in the presence of a catalyst system consisting essentially of titanium trichloride, diethylaluminum chloride, and diethylaluminum iodide wherein
   (c) the mole percent ratio of diethylaluminum chloride to diethylaluminum iodide is between about 4:1 and about 0.5:1 and
   (d) the molar ratio of aluminum to titanium is between about 3:1 and about 6:1.

2. The method defined in claim 1 wherein
   (a) said monomer mixture contains about 92–94 mole percent butene-1 and about 8–6 mole percent propylene, and
   (c) said mole percent ratio of diethylaluminum chloride to diethylaluminum iodide is between about 1.5:1 and about 0.5:1.

3. The method defined in claim 2 wherein
   (b) said temperature is about 140° F.
   (c) said mole percent ratio of diethylaluminum chloride to diethylaluminum iodide is about 1.5:1, and,
   (d) said molar ratio of aluminum to titanium is about 6:1.

4. The method defined in claim 1 wherein
   (a) said monomer mixture contains about 95 mole percent butene-1 and about 5 mole percent propylene,
   (b) said temperature is about 150° F.,
   (c) said mole percent ratio of diethylaluminum chloride to diethylaluminum iodide is about 4:1, and
   (d) said molar ratio of aluminum to titanium is about 3:1.

5. The method defined in claim 1 wherein
   (a) said monomer mixture contains about 92 mole percent butene-1 and about 8 mole percent propylene,
   (b) said temperature is about 150° F.,
   (c) said mole percent ratio of diethylaluminum chloride to diethylaluminum iodide is about 0.67:1, and
   (d) said molar ratio of aluminum to titanium is about 4:1.

6. The method defined in claim 1 wherein
   (a) said monomer mixture contains about 91.5 mole percent butene-1 and about 8.5 mole percent propylene,
   (b) said temperature is about 140° F.,
   (c) said mole percent ratio of diethylaluminum chloride to diethylaluminum iodide is about 1.5:1, and
   (d) said molar ratio of aluminum to titanium is about 6:1.

7. A copolymer of butene-1 and propylene that rapidly forms the stable Form I upon cooling from the melt, has a post-crystallization of less than 0.5 weight percent, and a tensile modulus greater than about 25,000 p.s.i., wherein the amount of propylene in said copolymer is between about 10 mole percent and about 18 mole percent and a $d_{110}$ spacing correlated with the mole percent propylene in said copolymer to define a point falling within the area delineated by points A, B, C, and D in FIG. 3; said copolymer being prepared by the process of claim 1.

References Cited

UNITED STATES PATENTS

| | | | |
|---|---|---|---|
| 3,205,216 | 9/1965 | McManimie et al. | 260—94.9 |
| 3,332,921 | 7/1967 | Cleary | 260—88.2 |
| 2,918,457 | 12/1959 | Jezl | 260—88.2 |

JOSEPH L. SCHOFER, Primary Examiner

ROGER S. BENJAMIN, Assistant Examiner

UNITED STATES PATENT OFFICE
CERTIFICATE OF CORRECTION

Patent No. 3,464,962          Dated September 2, 1969

Inventor(s) CYRIL GEACINTOV, RAYMOND EICHEMBAUM, & WILLIAM C.L. WU

It is certified that error appears in the above-identified patent and that said Letters Patent are hereby corrected as shown below:

| | |
|---|---|
| Column 6, line 35 | for "feed con-" read --temperature-- |
| Column 7, line 43 | for "deflection" read --reflection-- |
| Column 7 line 52 Table V | for "8.778" read --8.772-- |
| Column 7, line 53 Table V | for "8.762" read --8.768-- |

SIGNED AND
SEALED
MAY 5 1970

(SEAL)
Attest:

Edward M. Fletcher, Jr.
Attesting Officer

WILLIAM E. SCHUYLER, JR.
Commissioner of Patents